United States Patent [19]
Martucci

[11] 3,849,655
[45] Nov. 19, 1974

[54] LIGHT WATER REACTOR PRIMARY COOLANT LEAKAGE MONITOR

[75] Inventor: John Anthony Martucci, Hartford, Conn.

[73] Assignee: Combustion Engineering, Inc., Windsor, Conn.

[22] Filed: Dec. 15, 1972

[21] Appl. No.: 315,763

[52] U.S. Cl. ............ 250/366, 176/19 LD, 250/356, 250/432
[51] Int. Cl. ............................................. G01t 1/10
[58] Field of Search.................... 250/356, 366, 432; 176/19 LD

[56] References Cited
UNITED STATES PATENTS

| | | | |
|---|---|---|---|
| 2,599,922 | 6/1952 | Kanne | 176/19 LD |
| 3,070,532 | 12/1962 | Zebroski | 176/19 LD |
| 3,255,352 | 6/1966 | Johnston | 250/303 |
| 3,308,296 | 3/1967 | Cowan et al. | 250/366 |
| 3,370,173 | 2/1968 | Ackerman et al. | 250/252 |

Primary Examiner—Archie R. Borchelt
Assistant Examiner—Harold A. Dixon
Attorney, Agent, or Firm—Stephen L. Borst

[57] ABSTRACT

This invention consists of a method for the detection of leakage of a first fluid into a second fluid or into the surrounding atmospheric envelope. The first fluid is irradiated with high energy radiation to produce radionuclides which decay with the characteristic emission of angularly correlated radiations. One example of such a radionuclide is a positron emitter which decays with the emission of a positron which immediately annihilates with an electron. Two gamma photons are released from the positron-electron annihilation event and the gamma photons propagate in opposite directions. A sample of the second fluid is monitored by at least two scintillation detectors oriented to correspond with the characteristic angles of the angularly correlated radiations. The detectors are electrically connected to coincidence circuitry. Only those pairs of radiation emissions which simultaneously activate the angularly positioned scintillation detectors are registered on a counter.

12 Claims, 3 Drawing Figures 3,849,655

LIGHT WATER REACTOR PRIMARY COOLANT LEAKAGE MONITOR

BACKGROUND OF THE INVENTION

1. Field of the Invention

This invention relates to detection of leakage of irradiated water from its containment vessel. More specifically it relates to the detection of leakage of the primary coolant from the reactor coolant pressure boundary of a water-cooled reactor into either the containment atmosphere, the secondary heat exchange fluid, the auxiliary buildings or into the external atmosphere.

1. Prior Art

In the operation of nuclear reactors, various radioactive nuclides are formed in the reactor coolant when it passes through the core of the reactor. Certain of these radionuclides are transported with the resultant vapor or become gaseous species when the pressurized coolant is released to a lower pressure system or atmosphere. Another source of radiation in the reactor coolant originates from nuclear fuel elements in the core of the reactor whose cladding has ruptured, with the consequent release of radioactive fission materials. A third source of radioactivity in the reactor coolant is the presence of corrosion particles which have been circulated through the core, exposing them to reactor radiations and making them radioactive. A small percentage of these radioactive fission materials and corrosion particles also become airborne when the reactor coolant is in contact with a vapor phase (air or steam). Thus the coolant of a reactor and its vapor become highly radioactive, presenting considerable danger to personnel.

Consequently, it is of importance to prevent leakage of the irradiated reactor coolant from its reactor coolant pressure boundary into the containment atmosphere or into any other fluid (e.g. the heat exchange fluid which is the working fluid of the turbine-generator system of a pressurized water reactor). Realizing the impossibility of complete prevention of leakage, a rapid and sensitive detection means becomes of utmost importance. Early detection and location of leakage of the radioactive coolant minimizes personnel exposure dangers and subsequent decontamination equipment and procedures. Early detection also minimizes the possibility of discharging contaminated fluid (containment atmosphere, stack vapors, or liquids) into the atmosphere external to the nuclear reactor building and auxiliary buildings.

In the prior art, the most commonly used detection device has been a radiation detector that monitors the air of the containment building. An air pump continuously samples the containment air and directs a stream of this sampled air through an advancing filter which traps the contaminated particles that are borne by the air. These particles consist mainly of airborne corrosion particles or fission products released to the containment air from the leaking coolant. The continuously advancing filter is monitored by a sodium iodide scintillation counter-photomultiplier combination. The detector output is amplified by a preamplifier and transmitted to the Radiation Monitoring System cabinet in the Nuclear Plant Operations Control Room.

The greatest single disadvantage besides the rather high cost of this prior art system is that the scintillation counter responds to all gamma radiation whether of short or long half-life and regardless of whether it is indicative of a coolant leakage or not. Even noncontaminated or "clean" containment air has a minimum background count due to residual radioactive elements in the earth's atmosphere, principally radon and its decay products. Another source of background radiation is the incident high energy gamma radiation from outer space. A third source of background may be radioactive residues or deposits of long half-lives from prior contaminations which usually result from equipment maintenance or system leakage. These latter two background sources may be substantially eliminated by expensive shielding that isolates the detector from the external sources. However, the necessary shielding does not eliminate the residual background radiation of the air itself or long lived radioactive deposits that are formed on the detecting equipment and on the interior of the shielding from a prior or concurrent contaminating accident. In addition, as mentioned above, the containment air particulate monitor is not selective in that it cannot distinguish between a coolant leakage or another radioactive contamination accident since it only detects the presence of radioactivity without including a means for distinguishing between different types of radiation emitters.

A second disadvantage of the containment air particulate monitor is that the device relies on the dissemination of corrosion particles into the containment air, and transport of those particles to the detector by that air. Thus, the system is limited by the efficiency of dispersion of the particles into the air and by the transporting air currents. Both factors introduce an element of inefficiency and delay into the detection system. A further delay is introduced by the fact that a sufficient radioactive deposit must be accumulated on the filter to overcome the background experienced by the system before a meaningful detection can be made. Thus the background not only reduces the sensitivity of the detector but also retards the detector's reaction time.

A second prior art device is the containment radioactive gas monitor. This device measures the gaseous gamma activity in the containment atmosphere by taking a continuous air sample and drawing the sample through a closed, sealed system to a gas monitor assembly. The sample is constantly mixed in fixed, shielded volumes, and is viewed by Geiger-Mueller tubes mounted in a constant gas volume container. Shielding is provided to minimize the effect of background radiation on the detector's sensitivity, but as a whole the containment radioactive gas monitor is inherently less sensitive than the above-described containment air particulate monitor.

SUMMARY OF THE INVENTION

The present invention is proposed to overcome the cost, background, delay time and shielding problems of the prior art detectors of radioactive leakage in water-cooled reactors. The mechanism relied on for detection is the radioactive decay of nitrogen-13 and of fluorine-18, found in irradiated water, by the emission of positrons. The emitted positron is short lived $10^{-10}$ sec.) since it rapidly encounters an electron. The electron and positron undergo destructive annihilation with the release of two gamma photons which propagate in opposite directions (0°– 180°).

The above decay characteristics of nitrogen-13 and fluorine-18 enable the easy isolation and detection of the presence of irradiated water or water vapor with a very low or negligible background. The detection method is designed to "see" and count only the angularly correlated positron-electron annihilation event, thereby reducing other background to zero. Two diametrically opposed mutually facing scintillation detectors are used to detect the annihilation event. All other single gamma emitting events are screened out of the counting system by means of coincidence circuitry. Thus, an event will only be recorded if both scintillation detectors are simultaneously activated, as would be the case for a positron-electron annihilation. The invention may also be utilized to detect other radionuclides which decay with characteristic angularly correlated radiations by appropriately positioning the detectors at the proper angles.

A sample of the fluid to be monitored is passed over an absorption bed situated between the two detectors. The aborption bed or molecular sieve selectively traps the radioactive element nitrogen-13 or other radionuclide which decays with characteristic angularly correlated radiations and thereby concentrates the trapped radionuclide and increases the detector's sensitivity. Absent such angularly correlated emissions, the presence of which indicates a leak of irradiated water or the presence of other radionuclides of interest, the detecting system does not count the pulse from a singly and individually activated scintillation detector.

DESCRIPTION OF THE PREFERRED EMBODIMENT

Figure 1:
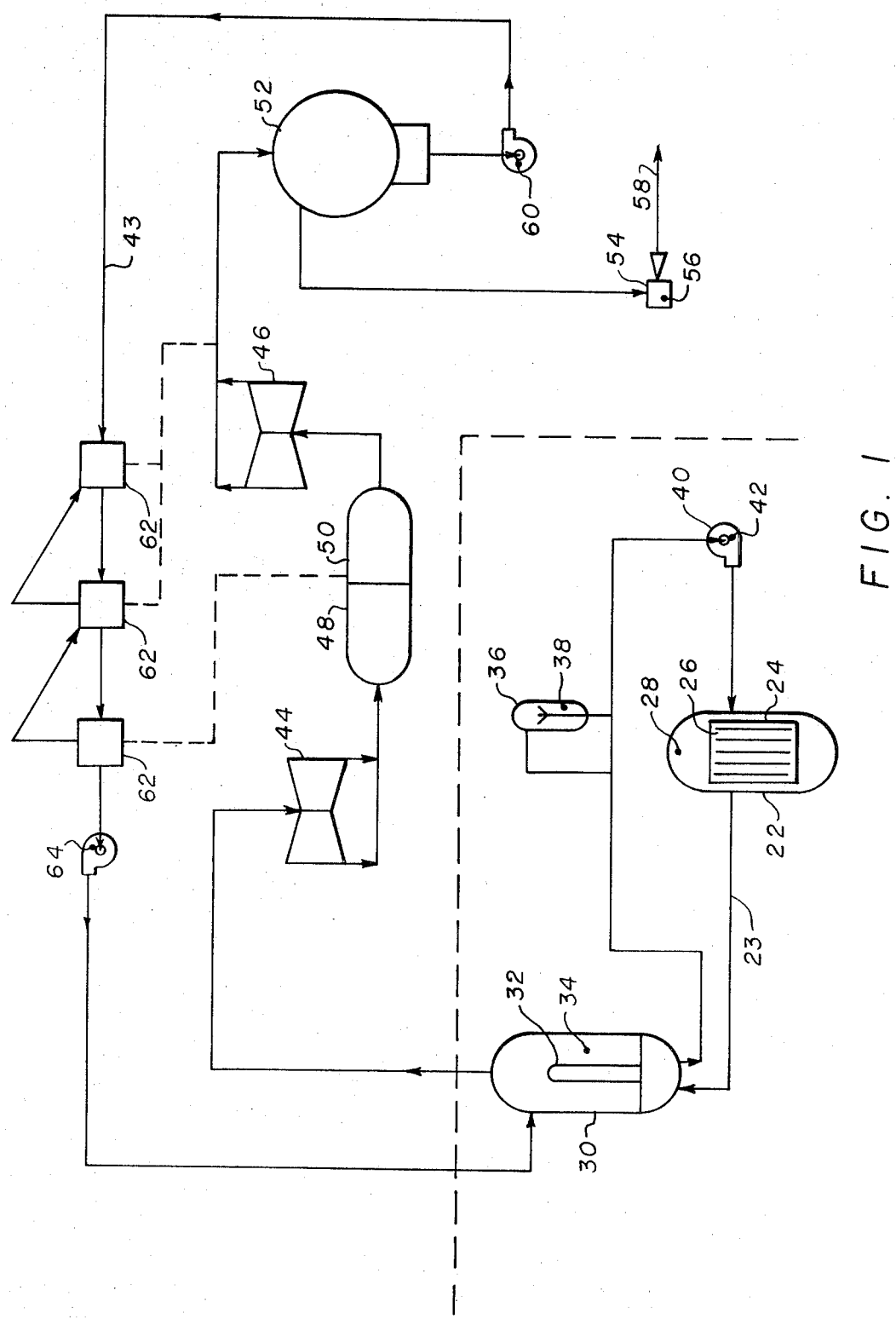
FIG. 1 is a schematic diagram of the operating components of a nuclear power reactor and its power generation system.

Referring to FIG. 1, the primary 23 and secondary 43 coolant systems of a pressurized water reactor 22 can be seen. The pressurized water reactor 22 operates with a light water coolant continuously circulated through its core 24 and around its fuel elements and control rods 26 in the closed pressurized primary coolant system 23, commonly called the reactor coolant pressure boundary. The coolant is circulated by pump 40 and is heated by its passage through the core. After passing through the reactor core 24, where it also acts as a neutron moderator, the coolant passes through the heat exchanger or boiler 30. Within the boiler 30, the primary coolant passes through a multiplicity of heat exchange tubes 32 around which flows the secondary coolant, which is also water. During the primary coolant's passage through the boiler 30, the primary coolant exchanges heat with the secondary coolant. After leaving the boiler, the coolant is returned to the reactor 22 to undergo reheating and recirculation.

Changes in the core average temperature due to power excursions and changes in reactivity, and subsequent correction by control rod movement make the system coolant volume a variable. These volume changes cause wide variations in coolant system pressure if the plant were operated as a solid system. Therefore, the coolant system incorporates a pressurizer 36 whose function it is to regulate the system's pressure.

When the water coolant passes through the reactor core, the water is exposed to neutron and proton flux. As a result, radioactive species $N^{13}$ and $F^{18}$ are formed by the induced nuclear reactions $O^{16}(p, \alpha)N^{13}$ and $O^{18}(p, n)F^{18}$ respectively. These radionuclei will also exist in the gaseous form if the pressurized water is released by a leak or some other mechanism to the containment atmosphere. Other radionuclei are also formed which decay with coincident, angularly correlated emissions.

In the case of $N^{13}$, the nitrogen becomes molecularly associated with hydrogen to form ammonia in the reactor coolant. Upon release, this gas rapidly expands to occupy the entire volume of the containment building or area into which it has been released according to Dalton's Law of Partial Pressures. This expansion is believed to occur by molecular diffusion rather than by disperson which depends on the air currents within the containment building. Thus a detector designed to detect $N^{13}$ would receive an indication of the presence of radioactive $N^{13}$ at the earliest possible moment and would not be limited by the transportation of a radioactive particulate by unreliable and relatively slow containment air currents. Since nitrogen-13 is a vaporous species it will not deposit or settle in sample lines and since it has a short half-life it will not build up background which might reduce future detecting sensitivity. It should also be recognized that a detector designed to detect $N^{13}$ or $F^{18}$ does not rely on any radioactive particulate matter within the water coolant which is the result of a failure of the fuel element cladding within the reactor core. Thus, such a detection system would indicate a water leak from the primary coolant even in the absence of failed fuel.

The pressurized water reactor primary coolant system is susceptible to leakage at a number of points. These points are the control rod drive mechanism housing 28 at the top of the reactor pressure vessel, the connections and safety valves of the pressurizer 38, the coolant circulating pumps 42 and at any other valve or other external system penetration not shown in FIG. 1. In addition, the heat exchange tubes 32 in the boiler 30 in current commercial plants have failed, allowing leakage of the radioactive primary coolant water, maintained at a pressure of 2,100 psi, into the normally non-radioactive secondary heat exchange coolant maintained at a pressure of 735 psi. In this manner the secondary coolant also becomes contaminated. As a result, radioactive vapors may be expelled from the secondary system from condenser 52 through air ejection vent 54 and out the plant stack diagrammatically illustrated in FIG. 1 by line 58. Consequently, an important monitoring point for the detection of escaping radioactive vapor is indicated by point 56 at the air ejection vent 54.

In FIG. 1, the secondary coolant system 43 can be traced with the coolant first being circulated through and heated in the boiler 30. The resultant pressurized steam is first passed through a high pressure turbine 44 with a low pressure discharge to a moisture separator 48 and reheater 50. Next, the separated steam of lower pressure is passed through a second, low pressure turbine 46 with discharge to the condenser 52. In the condenser 52 the remaining steam is converted into water which is circulated by pumps 60 and 64 back to the boiler 30 with sequential passage through a series of reheaters 62.

Some air unavoidably leaks into the secondary system from numerous sources: turbine gland leakage, porous exhaust hoods, drains, flexible condenser joints, air in the circulating water of jet condensers, or any air originally in the steam. This air is in general not removed with the condensate and circulating water, and tends to concentrate in the condenser 52 and increase the turbine exhaust pressure. Accordingly, it is removed by an air ejection vent 54 and a pumping means not shown which has its suction in the steam space of the condenser 52 and which draws out a mixture of air and steam. The air ejector vent 54 ejects air into the stack 58 and eventually into the external atmosphere. If leakage of radioactive primary coolant into the secondary coolant through the heat exchanger 30 has occurred, the secondary coolant and consequently the air-steam combination vented to the stack 58 by the air ejection vent 54 will also contain radioactivity. This is undesirable since the external atmosphere might be contaminated. Therefore, it is necessary to have an extremely sensitive and rapid contamination detection means located at the air ejection vent 54 or stack 58 to monitor the discharged gases as illustrated by leakage point 56.

Figure 2:
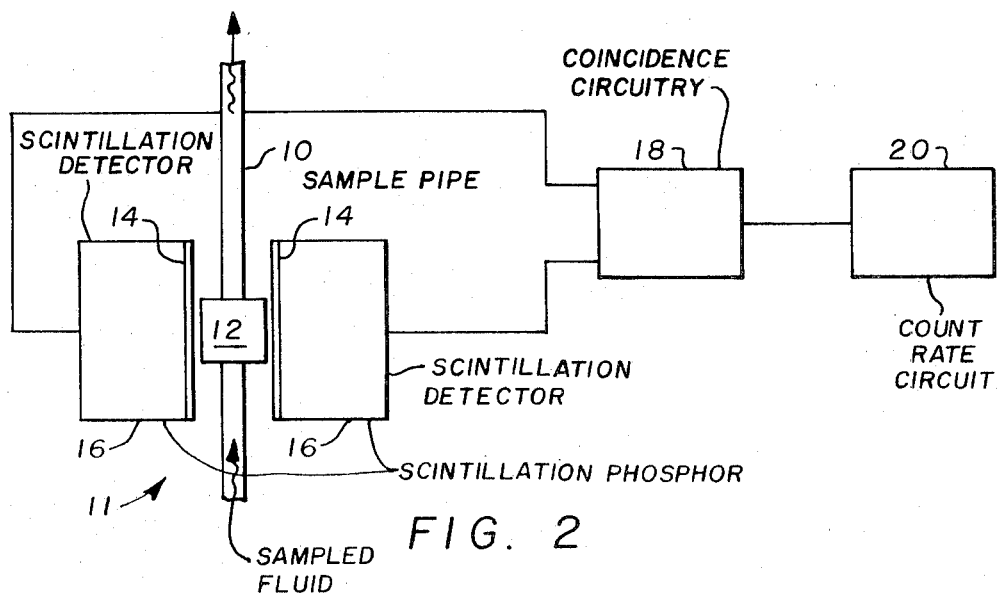
FIG. 2 is a semi-schematic diagram of a light water reactor primary system leakage monitor.

The proposed invention is illustrated in a semi-schematic manner in FIG. 2. A sample of the containment air is taken from a general position within the reactor containment building or from any number of local positions around the primary and secondary coolant systems where leakage is suspected or where leakage is likely to occur. The sample is delivered to a detection site, generally denoted as 11, by a sample delivery tube or pipe 10. The sample is passed over or through a trap or absorbent bed 12 which traps the positron emitting radionuclide which is the source of radiation to be detected. More specifically, nitrogen-13 or fluorine 18 is trapped on a molecular sieve. A suggested commercially available molecular sieve for nitrogen-13 is molecular sieve 4A. Molecular sieves have the advantage that once the trapped radionuclide decays and transforms into a different element the trapping site once again becomes available to trap a subsequent radionuclide of the same species. Thus the molecular sieve is expected to have infinitely long useful service life. While a molecular sieve is the preferred means of trapping the radionuclide, any other means which performs this trapping function is within the scope of this invention. In fact, the proposed detection system would operate adequately, although with significantly reduced sensitivity, without any trapping means.

The detection site 11 and the molecular sieve 12 are "viewed" by a pair of diametrically opposed mutually facing scintillation detectors 16 whose scintillation surfaces 14 could be any scintillation phosphor which is transparent to its own excited radiation. A sodium iodide crystal is such a phosphor. The scintillation phosphor is optically coupled to a photomultiplier. Two detectors of large diameter crystals are proposed as the best means for "viewing" a solid angle that is as large as possible so that a greater percentage of the pairs of emitted gamma rays, emitted in random directions from different events, may be detected. However, the scope of the invention also includes a multiplicity of pairs of detectors radially positioned around the detection site 11 and at angles to be sensitive to other radionuclides of interest. When a gamma ray strikes the phosphor crystal 14, the phosphor emits a pulse of light which is multiplied by the photomultiplier and an electrical signal is sent through various signal amplification and shaping steps (not shown) to coincidence circuitry 18. The coincidence circuitry 18 consists of an electrical circuit that passes an electrical pulse to a count rate circuit or counter 20 only when both scintillation detectors have been simultaneously activated. A commercial example of such coincidence circuitry is Ortec Model 414A Fast Coincidence.

It is very improbable that the scintillation detectors would be simultaneously activated by any event or events other than a positron-electron annihilation or coincident gamma emission that occurs in region 11. This extremely low probability results in an extremely low background. Positron-electron annihilation will occur when a radionuclide emits a positron during its decay process, although some background positron-electron annihilation can be expected to occur when a high energy gamma ray passes close to a nucleus with the resulting phenomenon of pair production (i.e., production of an electron and positron). One such radionuclei which decays by emission of a high energy gamma ray, raising the possibility of background pair production and positron-electron annihilation, is nitrogen-16. The coincident background to be expected from nitrogen-16 is minimal however since $N^{16}$ decays with a short half-life of 7.13 seconds. Thus the background to be expected from $N^{16}$ rapidly diminishes to the negligible level and is not a serious interference with the present invention's sensitivity as a detector of leakage of irradiated water. In fact, the background from nitrogen-16 can be screened out by placing an 80 second delay coil in the sample line 10 upstream of the coincidence detectors.

The proposed detector is much more sensitive than the prior art devices for all of the reasons already discussed and for the reason that nitrogen-13 has a concentration of about one to five microcuries per cubic centimeter of water coolant as opposed to a concentration of $10^{-3}$ or $10^{-4}$ microcuries per cubic centimeter for radioactive corrosion particles detected by the containment air particulate monitor. An additional advantage that the present invention has over the prior detectors is that the coincidence counters only detect the presence of irradiated water, and do not give a false signal deriving from other sources of radioactivity. The presently used containment air particulate monitors activate an alarm or warning signal regardless of the source of the radiation. Thus the air particulate monitors do not particularly facilitate the detection of a specific water leak from a specific point, whereas specific leak location is possible with the coincidence detector system disclosed in this application.

Figure 3:
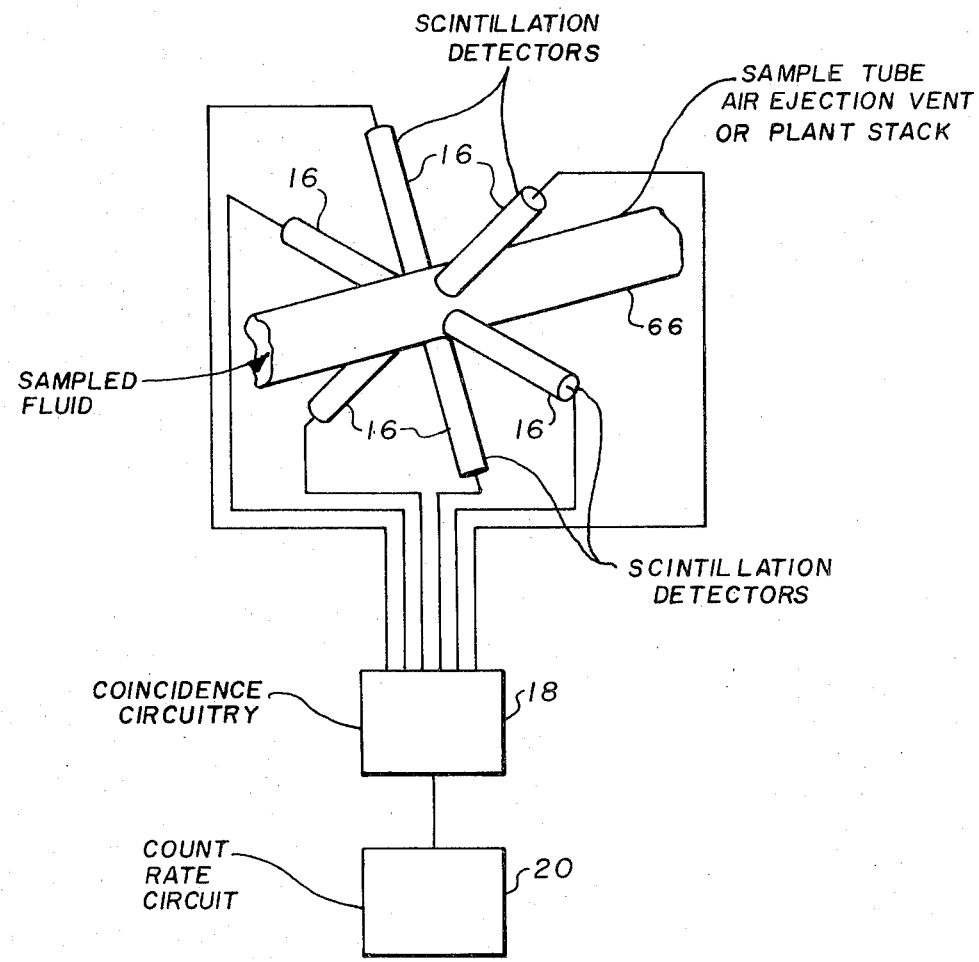
FIG. 3 is a diagram of light water reactor leakage monitor positioned to detect radioactive leakage passing through a pipe, duct or exhaust stack.

FIG. 3 depicts a possible arrangement for the use of the above-described invention in monitoring the passage of fluids through a tube or duct 66. The monitoring arrangement would have specific application to detecting the leakage of irradiated water or water vapor out of the above-described air ejection vent 54 or through the plant stack 58 which discharges gases to the environment. A multiplicity of pairs of detectors 16 are radially spaced around the outside of the duct or pipe 66 which may be the cylindrical conduit of either the air ejection vent 54 or the plant stack 58 through which vapors expelled from the secondary coolant system pass. The pairs of detectors are electrically connected to coincidence circuitry 18 which in turn are connected to a count rate circuit or counter 20.

While the above-described invention is particularly suited to the detection of radioactive irradiated water leakage from the coolant systems of a nuclear reactor, it is not intended herein that the scope of the invention be limited to use only for detection of water leakage from reactor water systems. It is evident that the advantages of this invention have equally as broad application to many other situations where rapid detection of the leakage of a fluid is desirable. One need only to irradiate the leaking fluid to form positron emitting radionuclides or to introduce a positron emitting radionuclide tracer into the suspected leaking fluid. Also, while the description of the preferred embodiment speaks primarily to the detection of positron-emitting radionuclides, it is not intended that the scope of the invention be so limited. Any radionuclide that decays with the characteristic emission of angularly correlated radiations may be detected, with low background, using coincidence detectors appropriately positioned to correspond with the characteristic angles of the radionuclide to be detected.

What is claimed is:

1. A method for the detection of leakage from the reactor coolant pressure boundary of a water cooled reactor which is surrounded by a containment fluid wherein said reactor coolant is irradiated with high energy protons to activate oxygen nuclei to produce nitrogen-13 which is chemically bound in ammonia molecules, the method comprising:
   a. sampling said fluid surrounding the exterior of said reactor coolant pressure boundary;
   b. absorbing said nitrogen-13 and ammonia, on a molecular sieve;
   c. detecting gamma photons emanating from said nitrogen-13 by at least one pair of diametrically opposed mutually facing radiation detectors responsive to gamma photons; and
   d. registering only those detected gamma photons which simultaneously activate one pair of said diametrically opposed detectors.

2. A method of monitoring nuclear reactor stack discharge vapors for radioactive contamination resulting from the leakage of irradiated water, the method comprising:
   a. detecting the presence of positron emitting radionuclides by at least one pair of diametrically opposed mutually facing detectors responsive to gamma photons situated around the exterior of said stack; and
   b. registering only those gamma photons which simultaneously activate one pair of said diametrically opposed detectors.

3. A method of monitoring a nuclear reactor air ejection vent for discharge of radioactive water vapors, the method comprising:
   a. detecting the presence of nitrogen-13 by at least one pair of diametrically opposed mutually facing detectors responsive to gamma photons which are situated around the exterior of said air ejection vent; and
   b. registering only those gamma photons which simultaneously activate one pair of said diametrically opposed detectors.

4. A method for the detection of leakage from a fluid containing system, one element of said fluid consisting of oxygen, the steps comprising:
   a. irradiating said fluid with protons to activate the nuclei of said oxygen to produce fluorine-18;
   b. sampling the fluid surrounding the exterior of said fluid containing system;
   c. detecting angularly correlated gamma photons emanating from said sample by at least one pair of diametrically opposed mutually facing radiation detectors; and
   d. registering only those detected gamma photons which simultaneously activate one pair of said diametrically opposed detectors.

5. A method for the detection of leakage from the reactor coolant pressure boundary of a water cooled reactor wherein said reactor coolant is irradiated with high energy protons to activate oxygen-18 nuclei to produce fluorine-18, the steps comprising:
   a. sampling the fluid around said reactor coolant pressure boundary;
   b. absorbing said fluorine-18 on a molecular sieve;
   c. detecting gamma photons emanating from said fluorine-18 by at least one pair of diametrically opposed mutually facing radiation detectors responsive to gamma photons; and
   d. registering only those detected gamma photons which simultaneously activate one pair of said diametrically opposed detectors.

6. A method for the detection of leakage from the reactor coolant pressure boundary of a water cooled reactor which is surrounded by a second fluid wherein said reactor coolant is irradiated with high energy protons to activate oxygen nuclei to produce nitrogen-13 which is chemically bound in ammonia molecules, the method comprising:
   a. sampling said fluid surrounding the exterior of said reactor coolant pressure boundary;
   b. detecting gamma photons emanating from said nitrogen-13 by at least one pair of diametrically opposed mutually facing radiation detectors responsive to gamma photons; and
   c. registering only those detected gamma photons which simultaneously activate one pair of said diametrically opposed detectors.

7. A method of detecting leakage of a first fluid containing positron emitting radionuclides into a second fluid of lower relative pressure lacking positron emitting radionuclides wherein said first fluid is the coolant of a nuclear steam supply system and said positron emitting radionuclide is nitrogen-13, the method comprising:
   a. sampling the second fluid;
   b. detecting radiation emanating from said sample by at least one pair of diametrically opposed mutually facing radiation detectors; and
   c. registering only those gamma photons which simultaneously activate one pair of said diametrically opposed radiation detectors.

8. The method of detecting the leakage of coolant from a nuclear steam supply system into a second fluid as recited in claim 7 wherein said nitrogen-13 is chemically bound in ammonia molecules, the method further comprising the step of:

a. absorbing said nitrogen-13 and ammonia on a molecular sieve.

9. A method of detecting leakage of a first fluid containing positron emitting radionuclides into a second fluid of lower relative pressure lacking positron emitting radionuclides wherein said first fluid is the coolant of a nuclear steam supply system and said positron emitting radionuclide is fluorine-18, the method comprising:
   a. sampling the second fluid;
   b. detecting radiation emanating from said sample by at least one pair of diametrically opposed mutually facing radiation detectors; and
   c. registering only those gamma photons which simultaneously activate one pair of said diametrically opposed radiation detectors.

10. A method for the detection of leakage from a fluid containing system, one element of said fluid consisting of oxygen:
   a. irradiating said fluid with protons to activate the nuclei of said oxygen to produce nitrogen-13;
   b. sampling the fluid surrounding the exterior of said fluid containing system;
   c. detecting angularly correlated gamma photons emanating from said sample by at least one pair of diametrically opposed mutually facing radiation detectors; and
   d. registering only those detected gamma photons which simultaneously activate one pair of said diametrically opposed detectors.

11. The method as recited in claim 10 wherein the method further comprises the step of absorbing said nitrogen-13 from said fluid sample on an absorbent bed intermediate the steps of sampling said surrounding fluid and of detecting said gamma photons.

12. The method of claim 11 wherein said absorbent bed is a molecular sieve.

* * * * *